May 1, 1962  J. W. ROTHROCK ET AL  3,032,547
KANAMYCIN A SEPARATION PROCESS
Filed Sept. 12, 1958  2 Sheets-Sheet 1
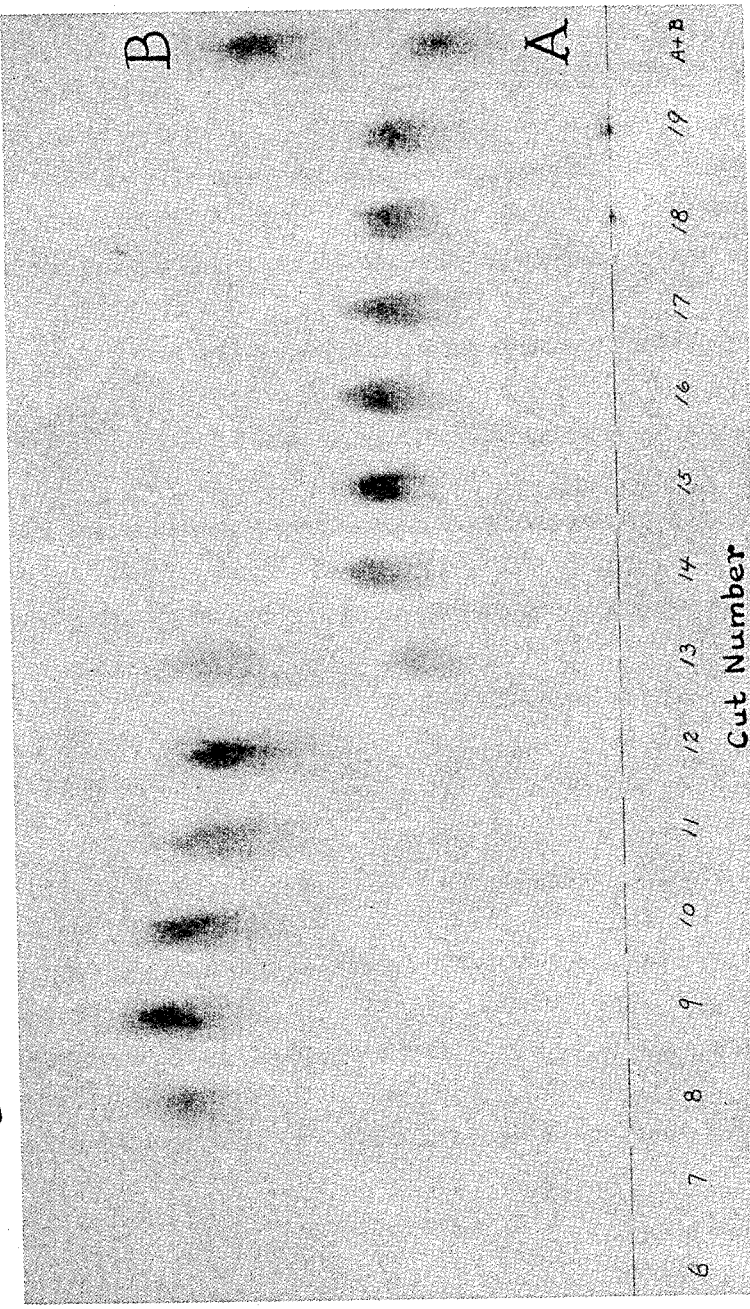
Fig. 1 – Chromatogram of Kanamycin Eluate
Inventors:
John W. Rothrock
Irving Putter
By *Michael A. Tandzella*
       Attorney

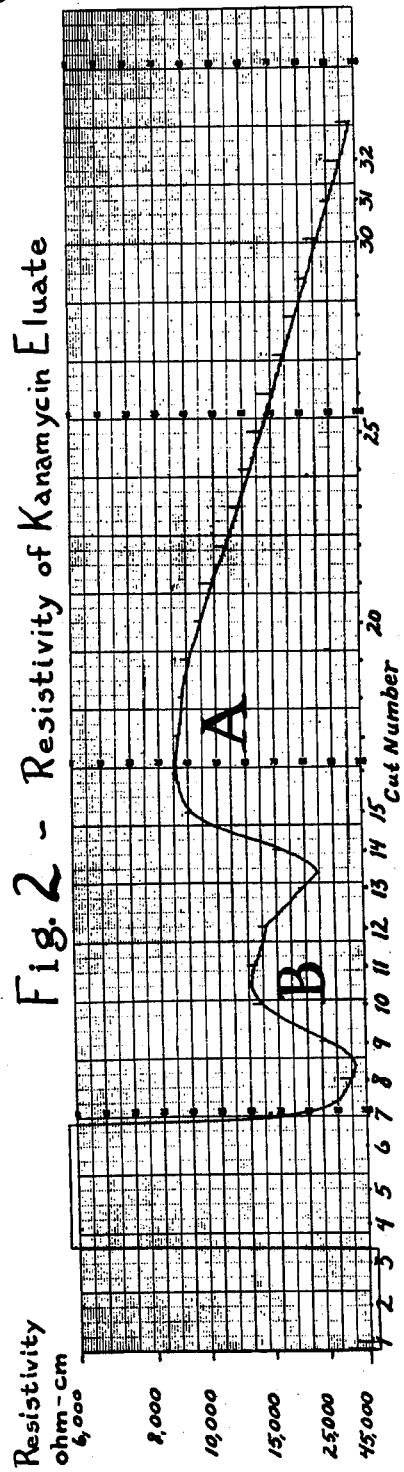

3,032,547
KANAMYCIN A SEPARATION PROCESS
John W. Rothrock, North Plainfield, and Irving Putter, Martinsville, N.J., assignors to Merck & Co., Inc., Rahway, N.J., a corporation of New Jersey
Filed Sept. 12, 1958, Ser. No. 760,660
4 Claims. (Cl. 260—210)

This invention relates to kanamycin. More particularly, this invention is directed to a process for separating kanamycin A, the desired antibiotic, from crude mixtures or solutions containing kanamycin A, undesired kanamycin B, which is somewhat more toxic, and other materials that may be present in such crude mixtures.

Kanamycin, an antibiotic produced from the fermentation of various strains of *Streptomyces kanamyceticus*, has been shown to possess desirable antibiotic properties against various species of gram-positive and gram-negative bacteria. It has been found that these desirable antibiotic properties are due to the presence of a substance which has been denominated kanamycin A. This substance has been shown to have the following chemical structure:

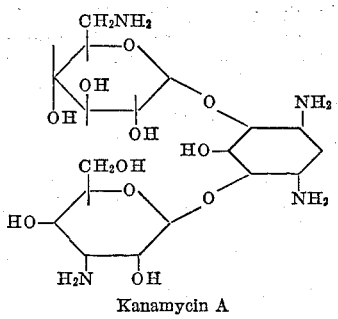

Kanamycin A

Kanamycin A appears in the fermentates in admixture with other forms of kanamycin, the structures of which are as yet unknown, and various other materials including water insoluble substances, salts and colored impurities. The designation, kanamycin B, has been given to the form of kanamycin which along with kanamycin A, occurs in the greatest proportion. Another form of kanamycin, which has been called kanamycin C, is presumably present in very small quantities. While kanamycin A has been shown to have desirable antibiotic properties, kanamycin B, which also displays antibiotic properties, has been found to be somewhat more toxic than kanamycin A and therefore its presence as a contaminant of kanamycin A is undesirable. The toxicity of kanamycin C, which has not as yet been isolated, is unknown.

The chemical and physical properties of kanamycin A and kanamycin B are so similar that separation of these two compounds is extremely difficult. The properties of kanamycin C closely approximate those of kanamycin B and in the following description it should be understood that reference to kanamycin B also applies to a mixture of kanamycins B and C. The usual separative procedures are of little value in separating kanamycin A from kanamycin B. Crystallization of the compounds themselves or of various known salts of these compounds, for example, does not satisfactorily separate them. Kanamycins A and B have been separated from each other by countercurrent distribution of the salicylidene derivatives of the crude kanamycin mixture using a methanol-water-chloroform-benzene (5:4:2:1) system, but this procedure is not satisfactory for large scale operations since it involves complicated procedures which cannot satisfactorily be accomplished with facility.

Accordingly, it is an object of the instant invention to provide a process whereby kanamycin A can be separated from kanamycin B and other materials, which process is readily adaptable to large scale operations, economical and relatively easily accomplished.

A further object of this invention is to provide such a process which is capable of isolating kanamycin A in an essentially pure form suitable for pharmaceutical use.

It has now been found that these and other objects may be accomplished by means of a chromatographic process wherein both kanamycin A and kanamycin B are adsorbed upon a suitable ion exchange resin and then the kanamycin A and the kanamycin B are separately and selectively eluted from the resin. In practice, kanamycin A and kanamycin B are believed to form discrete bands in a chromatographic column when a solution containing them is slowly percolated through the column. Upon elution with a suitable solvent, the column development proceeds in such a way that the more mobile kanamycin B is preferentially eluted before the less mobile kanamycin A. By collecting fractions of the eluate, it is thus possible to completely separate the desired kanamycin A from the unwanted kanamycin B.

For the purposes of this invention, the kanamycin mixture which is subjected to the chromatographic process may be any of a wide variety of mixtures containing kanamycin which are obtained at various steps in the process by which kanamycin is prepared. Although the crude fermentation product containing the various kanamycins and other impurities could be used directly in the chromatographic process, it is desirable that a more highly purified solution be used for this purpose, since highly colored solutions may poison the resin, and salts are observed to convert the resin to the salt form, which is not chromatographically useful.

In the process for the isolation of the kanamycins from the fermentation broth in which they are produced, the fermentation broth is first screened to remove solid impurities and then the activity of the broth is adsorbed upon an acidic cation exchange resin, such as the Amberlite IRC–50 resin, and eluted with a weak base, such as ammonia, in order to remove various salts and other colored impurities. The eluate from this initial resin purification step is next decolorized to a greater extent such as by the use of an activated charcoal, such as Darco G–60 charcoal. The kanamycins are then crystallized from the decolorized eluate as the sulfates by the addition of methanol. The thus formed mono sulfates are then dissolved in water and passed through a column containing a basic anion exchange resin, such as the Amberlite IRA–401 resin, whereby the monosulfate solution is decolorized and the free bases are obtained.

For operation of the process of this invention the kanamycin feed mixture may be obtained from the cation exchange resin eluate, from the charcoal treated eluate, or, where a highly purified form is desired for use as feed, from the anion exchange resin eluate. The most satisfactory feed preparation is, of course, the most highly purified form of the kanamycin mixture, since the less pure kanamycin mixtures are found to utilize the chromatographic column for decolorization and purification as well as for separation of kanamycin A from kanamycin B. This necessarily decreases the efficiency of column operation.

The feed material preferably contains a range of from about 5% to about 50% total solids content. Below this level a volume so large as to be impractical must be used. Above this level, crystallization is found to occur. While better chromatographic separation is obtained at the higher concentrations, it is not practical to utilize a higher concentration than those in the described range because the density of the more highly concentrated solution is such as to cause the lighter resins to be displaced by the feed solution. It is observed in these instances that the upper part of the resin column actually floats on the feed solution. In the preferred range of concentrations, however, the chromatographic process proceeds in a manner such that reasonably tight bands are obtained and the resin is not displaced from the column by the feed.

Loadings as high as about 1 gram of kanamycin per 25 milliliters of resin have been used, but in general somewhat lower loadings are preferred. A loading of 1 gram per 50 milliliters of resin, for example, is found to give a sharp separation without overloading the resin.

The particular resins which have been found to be useful for the chromatographic separation of kanamycin A from kanamycin B may be characterized as porous anion exchange resins of the strongly basic quaternary amine type. A large number of such resins are known. Exemplary of these are the Amberlite IRA 400 and the Amberlite IRA 401 resins, the Dowex 1–x2 and Dowex 2–x4 resins and the Permutit SK resin. Other anion exchange resins of this general type may also be used. Mesh size of resin is not critical. Results using resins of between 40 and 200 mesh have been satisfactory. All resins are used on the hydroxyl cycle.

After the feed solution has been placed on top of the column of resin and has percolated into the resin column, a head of solvent is carefully built up and the desired flow rate is thereafter maintained so as to develop the column by eluting from the resin column the kanamycin A and the kanamycin B without disturbing the resin bed.

As solvents for the development of the column, it has been found that water, either distilled water or tap water, is a satisfactory solvent. If desired, aqueous solutions of organic solvents, such as aqueous solutions of alcohols or ketones, for example, methanol or acetone, may be used. For example, water with 5% added methanol is a satisfactory solvent. Higher concentrations of water miscible organic solvents may be used if desired, but too high a concentration may cause the kanamycins to crystallize in the column.

The flow rate of the developing solvent through the resin column may be varied with reasonable limits and is relative to the size of the operation. A flow rate which is too fast does not permit the attainment of equilibrium between the resin and the solution. A flow rate which is too slow is time consuming. As an example of a suitable flow rate, a column containing a 400 milliliter bed of Dowex 1–x2 resin which is 30 inches deep may be developed at a flow rate of 3.5 milliliters per minute. For this same system a flow rate of 7 milliliters per minute would be too fast.

Elution from the chromatographic column produces first a fore-run, including the resin column void and inorganic hydroxides, then the kanamycin B, followed by a mixture of the kanamycin B and kanamycin C and finally the kanamycin A, which is the least mobile of the kanamycins.

The course of the elution may be followed by reference to a paper strip chromatogram of the various fractions eluted. The chromatogram is observed conventionally using a dye which for convenience has been called "chromato red." This dye is formed by coupling diazotized pararosaniline with 1-naphthol-4-sulfonic acid. The procedure used is to spot strips of Whatman No. 1 filter paper with fractions of the eluate, each of which contains 20 micrograms of kanamycins and to develop the chromatogram for a period of 18 hours with water-saturated butanol containing 2% p-toluenesulfonic acid. The dried papers are then dipped in chromato red and the excess dye is removed by alternately washing with warm water and methanol. The less mobile kanamycin A appears as a red spot with an $R_f$ 0.15–0.22 and the more mobile kanamycin B as a red spot with an $R_f$ 0.25–0.40. Kanamycin C has a mobility approximately midway between these values.

A typical chromatogram is shown in FIGURE 1 wherein the cuts of eluate are numbered consecutively from 6 to 19 with the strip labeled "A+B" being that obtained by development of a synthetic mixture of kanamycins A and B. It may be seen from this drawing that the kanamycin B, which is known to be the more mobile of the two kanamycins, appears in cuts 8 through 12 and partly in cut 13 whereas the less mobile kanamycin A appears in cuts 14 through 19 with some appearing in cut 13. In this example kanamycin C occurred in such a low concentration that it was not detected in the chromatogram. Cuts 14 through 19 are thus seen to contain kanamycin A uncontaminated with kanamycin B.

Although the development of paper strip chromatograms offers a tool for determining when the elution of kanamycin A begins, it does not readily adapt itself to following the progress of the elution because of the time needed to develop the paper strips. However, various other techniques may be used for following the elution.

One of these techniques is the determination of total solids in the eluate, which is a measure of the number of milligrams of solid per milliliter of eluate. This value is obtained by weighing the residue remaining upon the evaporation of a five milliliter aliquot of eluate and dividing this weight by the number five. The total solids have been found to reach a minimum at the point where kanamycin A begins to appear in the eluate. However, it can be seen that this method is also subject to the difficulty that the length of time in obtaining the desired values renders the method inapplicable to commercial operations.

Measurement of pH is another technique which may be used, since the pH of the eluate goes through a minimum at the point where kanamycin A appears in the eluate, but pH measurement is not satisfactory for this purpose because the variations in pH are so small that the accuracy of the measurement of pH is not sufficiently great for use in defining a sharp separation.

Chemical assays, such as the furfural generation method, may be used to observe and to detect the presence of kanamycin A. This chemical assay is based on the generation of a furfural-like material from kanamycin A by the action of sulfuric acid. A solution containing approximately one milligram of kanamycin base, six milliliters of water and four milliliters of concentrated sulfuric acid is thoroughly mixed. One-half of this sample is held in an ice-bath and used as a blank in the spectrophotometer, while the other half is heated in a covered tube in a boiling water bath for one hour. Both samples are then cooled to room temperature and readings of optical density are made at 2800 A. by means of a Beckman spectrophotometer (Model DU). The reading of the unknown is compared to the reading of a standard sample of known kanamycin base concentration run at the same time. The result is expressed in micrograms of unknown per milligram of standard. However, it is known that sugars also give a positive test and so this method may be subject to some difficulties in instances where it is possible that sugars may be present.

Biological assays, for example, the measurement of the zone of inhibition of growth of the organism *B. subtilis*, may be used to show the presence of either of the kanamycins, A or B. This is the standard and well known cup assay. Onto a petri dish containing a layer of agar seeded with *B. subtilis* is placed six metal cylinders (volume about 0.3 milliliter). Into alternate cylinders is placed a standard solution of known kanamycin concentration and the remaining cylinders are filled with the unknown solution. After an 18 hour incubation period the diameter of the zones of inhibition (the antibiotic diffuses through the agar and inhibits the growth of the organism) is measured and compared with the standard. The result is expressed in micrograms of unknown per milligram of standard.

In practice, it is observed that upon elution of the chromatographic column the biological activity appears in the early cuts whereas chemical activity does not appear until the later cuts, that is, until the kanamycin A begins to appear. However, in addition to the above-mentioned difficulties inherent in assay techniques, the time element in obtaining the assays rules against this method as a useful tool in following the separation of kanamycin A from kanamycin B.

It has been found that the continuous measurement of resistivity provides a convenient technique for determining the composition of these chromatographic eluates. Two maxima in the resistivity of the eluates are observed to occur, the first when elution of kanamycin B begins and the second when elution of kanamycin A begins. Resistivity measurement is instantaneous and sufficiently accurate within the limits encountered during the elution of the chromatographic column to permit a close separation of kanamycin A from kanamycin B by fraction cutting. More particularly, by means of a recording instrument whereby a graphic representation of various physical values may be obtained, it is possible, by reference to such graphical representation, to determine the point at which the desired kanamycin A is being eluted from the chromatographic column and to collect subsequent fractions, thereby obtaining kanamycin A separate from kanamycin B.

A graph of the resistivity values obtained in a representative elution is shown in FIGURE 2 wherein the numbered cuts correspond to those shown in the paper strip chromatogram of FIGURE 1. The resistivity of about the first 0.3 resin volume of eluate, the resin column void, is seen to be high. Cuts 4 to 6 in turn, comprising about 0.4 resin volume of eluate, have a very low resistivity due to elution of inorganic hydroxides. Beginning at about cut 7 the resistivity rises sharply to a maximum whereupon elution of kanamycin B begins. The presence of kanamycin B in the eluate is shown by that portion of the curve over the letter "B." Kanamycin B is thus eluted in about 0.7 column volume in cuts 8 to 13 along with some kanamycin C, as evidenced by the shoulder in cut 12. Beginning at cut 13 the resistivity goes through another maximum as the kanamycin A appears in the eluate. The elution of Kanamycin A is shown by that portion of the curve over the letter "A." Kanamycin A is thus eluted in 2.5 resin volumes in cuts 13 to 32. It can be seen that the maximum shown by the dip in the resistivity curve in cut 13 in FIGURE 2 corresponds with the appearance of the spots signifying the presence of kanamycin A in the paper strip chromatogram of FIGURE 1. Thus, the paper strip chromatogram is a check upon the accuracy of the resistivity method for determining the presence of kanamycin A in the eluate. It is anticipated that other physical constants such as refractive index, for example, may be utilized in the same manner that eluate resistivity is used to follow the course of the elution.

The invention will be better understood and appreciated by reference to the following examples which are included for purposes of illustration only and should not be construed as in any way limiting the scope of this invention, which scope is defined in the appended claims.

EXAMPLE 1

A 35 g. sample of crude crystalline kanamycin sulfate was dissolved in 230 ml. of distilled water to make a 15% solution. The dark brown solution was filtered through a thin pad of Supercel filter aid to remove insoluble materials. The filtrate was then percolated through a column containing 245 ml. of Amberlite IRA 401 resin on the hydroxyl cycle at the rate of 7 ml./min. 620 ml. of colorless eluate was collected and concentrated in vacuo to a solution containing 25% total solids. The yield from the elution was 95%.

A heavy-walled Pyrex column, 4 ft. high and 1 in. in internal diameter, was mounted in a perpendicular position, and filled with an aqueous slurry containing 400 ml. of 50–100 mesh Dowex 1–x2 resin on the hydroxyl cycle to a depth of 30 in. The resin was washed down-flow with deionized, distilled water having a resistivity of at least 45,000 ohm-cm. 40 ml. of the 25% solution of the mixed kanamycin base feed was placed on top of the level resin bed. After the feed had percolated into the resin a head of deionized, distilled water was carefully built up without disturbing the resin bed. The flow rate was maintained throughout at 3.5 ml./min. The eluate stream was run through a flow meter into a conductivity cell and into a fraction cutter. A Varian recorder (Model G–11A) was connected to the cell and a continuous recording of resistivity was made. The limits were set at 6,000–45,000 ohm-cm. The eluate was collected in 50 ml. cuts. In addition to the resistivity, total solids, chemical and biological assays, and refractive index were determined on the eluate and a paper strip chromatogram was prepared. The numerical data are shown in Table 1, the paper strip chromatogram is shown in FIGURE 1 and the resistivity recording is shown in FIGURE 2.

Table 1

| Cut No. | Total Solids, mg./ml. | Chem. Assay, mcg./mg. | Biol. Assay, mcg./mg. | Refractive Index |
|---|---|---|---|---|
| 1 | 0.06 | | | 1.3322 |
| 2 | 0.04 | | | 1.3323 |
| 3 | 0.24 | | | 1.3323 |
| 4 | 3.20 | | | 1.3334 |
| 5 | 5.26 | | | 1.3334 |
| 6 | 0.50 | | | 1.3324 |
| 7 | 0.10 | 81 | 85 | 1.3323 |
| 8 | 0.48 | 90 | 357 | 1.3323 |
| 9 | 3.16 | 50 | 784 | 1.3326 |
| 10 | 6.02 | 57 | 824 | 1.3330 |
| 11 | 5.16 | 56 | 861 | 1.3330 |
| 12 | 3.58 | 69 | 728 | 1.3329 |
| 13 | 2.42 | 543 | 791 | 1.3326 |
| 14 | 9.78 | 933 | 966 | 1.3337 |
| 15 | 18.68 | 1,001 | 888 | 1.3352 |
| 16 | 19.94 | 997 | 977 | 1.3352 |
| 17 | 19.12 | 932 | 859 | 1.3352 |
| 18 | 17.80 | 971 | 976 | 1.3352 |
| 19 | 15.66 | 942 | 921 | 1.3348 |
| 20 | 13.10 | 985 | 1,053 | 1.3346 |
| 21 | 11.56 | 1,009 | 8.5 | 1.3343 |
| 22 | 9.88 | 984 | 919 | 1.3338 |
| 23 | 8.32 | 1,019 | 872 | 1.3336 |
| 24 | 7.04 | 1,014 | 940 | 1.3334 |
| 25 | 6.36 | 970 | 961 | 1.3331 |
| 26 | 4.50 | 1,046 | 968 | 1.3330 |
| 27 | 3.64 | 1,073 | 897 | 1.3329 |
| 28 | 2.88 | 1,076 | 890 | 1.3327 |
| 29 | 2.20 | 1,034 | 949 | 1.3326 |
| 30 | 1.66 | 1,035 | 940 | 1.3324 |
| 31 | 1.20 | 1,060 | 976 | 1.3324 |
| 32 | 0.82 | 913 | 875 | 1.3323 |

From these data it can be seen that the minima observed in cut 13 in the measurement of total solids and refractive index coincide with the large increase in chemical assay in cut 13, the appearance of the spot for kanamycin A in the chromatogram of FIGURE 1, and the maximum in resistivity shown by the low point in the resistivity curve of FIGURE 2 in cut 13. Thus it has been shown that cut 13 marked the beginning of the elution of kanamycin A and that kanamycin A uncontaminated with kanamycin B or kanamycin C was eluted in cuts 14 to 32.

Similar results were obtained using Dowex 2–x4, Amberlite IRA 400 and Permutit SK resins. Dowex 1–x8 resin did not give satisfactory results, presumably because it is too highly cross-linked for this purpose.

Example 2

27 g. of crude kanamycin was chromatographed on 1 liter of Amberlite IRA 401 resin on the hydroxyl cycle. The eluate was collected in cuts using water as the eluting solvent and total solids, chemical, assays and biological assays were determined. The data are recorded in Table 2:

Table 2

| Sample | Volume, ml. | Total Solids, mg./ml. | Chem. Assay, mcg./mg. | Biol. Assay, mcg./mg. |
|---|---|---|---|---|
| Feed | 500 | 52.0 | 568 | 288 |
| Void | 300 | | | |
| Cut: | | | | |
| 1 | 100 | 0.4 | 0 | 0 |
| 2 | 100 | 1.0 | 0 | 0 |
| 3 | 100 | 1.3 | 0 | 0 |
| 4 | 100 | 1.8 | 0 | 0 |
| 5 | 100 | 2.4 | 0 | 104 |
| 6 | 100 | 3.7 | 0 | 379 |
| 7 | 100 | 4.2 | 0 | 477 |
| 8 | 100 | 6.0 | 0 | 333 |
| 9 | 100 | 6.7 | 29.9 | 672 |
| 10 | 100 | 7.3 | 54.8 | 657 |
| 11 | 100 | 6.0 | 50.0 | 833 |
| 12 | 500 | 7.4 | 324 | 1,010 |
| 13 | 500 | 6.9 | 855 | 1,090 |
| 14 | 1,000 | 4.0 | 1,423 | 1,250 |
| 15 | 1,000 | 2.9 | 760 | 1,030 |
| 16 | 1,000 | 1.3 | 685 | 923 |

From these data it can be seen that the minimum in total solids in cut 11 corresponds to the increase in chemical assay between cuts 11 and 12, which was due to the presence of kanamycin A in the eluate.

*Example 3*

The procedure of Example 1 was followed except that Amberlite IRA 401 resin on the hydroxyl cycle was used for both the preliminary purification of the kanamycin solution and for the chromatography, and the elutrient was water containing 5% methanol. Kanamycin B was eluted first, followed by a mixture of kanamycin A and decreasing amounts of kanamycin B, and then kanamycin A was eluted, as shown by measurement of total solids, and resistivity and development of a paper strip chromatogram.

*Example 4*

The procedure of Example 3 was followed except that the elutrient was water containing 5% acetone. The results were the same as in Example 3.

*Example 5*

The procedure of Example 1 was followed except that the feed was a 40 ml. sample of a 25% solution of crude, concentrated, decolorized kanamycin base obtained before crystallization of the crude kanamycin sulfate. The results showed that kanamycin A was present in the later eluate cuts uncontaminated by either kanamycin B or kanamycin C, which was detected as a spot midway between the spots for kanamycin A and kanamycin B in a paper chromatogram. Similar results were obtained using this feed before decolorization with Darco G-60 charcoal.

*Example 6*

The procedure of Example 1 was followed except that the feed consisted of 60 ml. of a 25% solution of kanamycin. Results similar to those of Example 1 were obtained.

*Example 7*

The procedure of Example 1 was followed except that the feed consisted of 20 ml. of 50% kanamycin solution. The results were similar to those of Example 1.

The above examples show that the novel procedure of this invention permits a quantitative and complete separation of kanamycin A from kanamycin B and kanamycin C. The procedure is readily adaptable to commercial operations in that various techniques may be used for determining the point at which the eluate contains the desired kanamycin A. Measurement of resistivity or of refractive index, in particular, provides a useful method for following the course of the elution. However, it should be realized that in a repetitive commercial process where the conditions are maintained approximately the same in succeeding runs, it would be possible to recover the kanamycin A uncontaminated by kanamycin B or kanamycin C by simply collecting the eluate at a predetermined point in the elution process. In addition, other methods for following the course of the elution may be used without departing from the scope of this invention.

Various other changes and modifications of the invention can be made, and to the extent that such variations incorporate the spirit of the instant invention, they are intended to be included within the scope of the appended claims.

What is claimed is:

1. A process for separating kanamycin A from aqueous solutions comprising a mixture of kanamycin A and kanamycin B which comprises contacting said solution with a column containing a porous, strongly basic, anion exchange resin of the quaternary amine type on the hydroxyl cycle, eluting said column with an elutrient selected from the group consisting of water and aqueous solutions of water miscible organic solvents, and recovering kanamycin B and kanamycin A in separate fractions of the resulting eluate.

2. A process for separating kanamycin A from aqueous solutions comprising a mixture of kanamycin A, kanamycin B and kanamycin C which comprises contacting said solution with a column containing a porous, strongly basic anion exchange resin of the quaternary amine type on the hydroxyl cycle, eluting said column with an elutrient selected from the group consisting of water and aqueous solutions of water miscible organic solvents, and recovering kanamycin B and C, and kanamycin A in separate fractions of the resulting eluate.

3. The process according to claim 1 wherein the elutrient is water.

4. The process according to claim 1 wherein the elutrient is an aqueous solution of methanol.

References Cited in the file of this patent

UNITED STATES PATENTS

| | | |
|---|---|---|
| 2,667,441 | Nager | Jan. 26, 1954 |
| 2,931,798 | Umezawa et al. | Apr. 5, 1960 |

OTHER REFERENCES

Osborn: Synthetic Ion-Exchangers, Chapman-Hall, London, 1955, page 21.

Umezawa: Jr. of Antibiotics, Ser. A, vol. X, No. 5, pages 184 and 185, September 1957.

Schmitz et al.: Jr. Am. Chem. Soc. 80, June 5, 1958, pages 2911–2.